(12) United States Patent
Sidhu et al.

(10) Patent No.: US 11,724,692 B2
(45) Date of Patent: Aug. 15, 2023

(54) DETECTION, WARNING AND PREPARATIVE ACTION FOR VEHICLE CONTACT MITIGATION

(71) Applicant: GM GLOBAL TECHNOLOGY OPERATIONS LLC, Detroit, MI (US)

(72) Inventors: Gurmeet S. Sidhu, Mississauga (CA); Jimmy Lu, Markham (CA); Tooba A. Sheikh, Toronto (CA); Jaeeun Choi, Markham (CA); Zahra Haeri, Markham (CA); David G. Biancaniello, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 17/033,251

(22) Filed: Sep. 25, 2020

(65) Prior Publication Data

US 2022/0097689 A1    Mar. 31, 2022

(51) Int. Cl.

| | |
|---|---|
| *B60W 30/09* | (2012.01) |
| *B60W 30/095* | (2012.01) |
| *G01S 19/52* | (2010.01) |
| *B60W 50/14* | (2020.01) |
| *B60K 35/00* | (2006.01) |
| *B60R 1/12* | (2006.01) |
| *B60W 10/18* | (2012.01) |
| *B60W 10/30* | (2006.01) |
| *B60Q 9/00* | (2006.01) |
| *G08G 1/16* | (2006.01) |

(52) U.S. Cl.
CPC ............ *B60W 30/09* (2013.01); *B60K 35/00* (2013.01); *B60Q 9/008* (2013.01); *B60R 1/12* (2013.01); *B60W 10/18* (2013.01); *B60W 10/30* (2013.01); *B60W 30/0956* (2013.01); *B60W 50/14* (2013.01); *G01S 19/52* (2013.01); *G08G 1/167* (2013.01); *B60K 2370/1529* (2019.05); *B60K 2370/178* (2019.05); *B60K 2370/191* (2019.05); *B60K 2370/193* (2019.05); *B60R 2001/1215* (2013.01); *B60W 2050/146* (2013.01)

(58) Field of Classification Search
USPC .......................................................... 701/70
See application file for complete search history.

(56) References Cited

U.S. PATENT DOCUMENTS

| | | | | |
|---|---|---|---|---|
| 2015/0062141 | A1* | 3/2015 | Hayasaka | G09G 5/003 345/581 |
| 2015/0109444 | A1* | 4/2015 | Zhang | G06V 20/58 348/148 |
| 2017/0120902 | A1* | 5/2017 | Kentley | B60R 19/42 |
| 2017/0349098 | A1* | 12/2017 | Uhm | G08G 1/0967 |

FOREIGN PATENT DOCUMENTS

CA    3029410 A1 *  6/2017

\* cited by examiner

*Primary Examiner* — Maceeh Anwari
(74) *Attorney, Agent, or Firm* — Lorenz & Kopf LLP (57) ABSTRACT

The present application relates to a system for providing alert notifications of possible vehicle contact events including a vehicle controller for determining a first velocity of a host vehicle, a sensor for determining a second velocity of a proximate vehicle, a processor configured for predicting a time of intersection of the first velocity and the second velocity generating a control signal in response to the time of intersection being less than a first threshold time, and a controller configured for providing a vehicle contact warning and performing a contact preparation action in response to the control signal.

13 Claims, 5 Drawing Sheets

DETECTION, WARNING AND PREPARATIVE ACTION FOR VEHICLE CONTACT MITIGATION

BACKGROUND

The present disclosure relates generally to programming motor vehicle detection and display systems. More specifically, aspects of this disclosure relate to systems, methods and devices for predicting proximate vehicle behavior, predicting an increased probability of a vehicle to vehicle contact event, and displaying an indication of the increased probability with the associated proximate vehicle and engaging preparative actions to mitigate the contact severity.

A human driver has many areas of focus when controlling a vehicle. Human drivers may not immediately recognize a situation in which a proximate vehicle and a host may have an increased likelihood of a vehicle contact event. Proximate vehicles may not be forward of the host vehicle and within the primary area of focus of the driver. In addition, additional occupants within a vehicle, mobile devices, or other vehicle systems may temporarily distract a driver from focusing on nearby vehicles reducing the likelihood of early detection of unexpected vehicle behaviors that may result in a vehicle contact. Often human drivers may not recognize a potential vehicle contact event with another vehicle until it is too late to take evasive maneuvers. It would be desirable to address these problems to provide a method and apparatus for predicting potential vehicle contact events and enabling vehicle systems to warn the driver in time to take corrective measures.

The above information disclosed in this background section is only for enhancement of understanding of the background of the invention and therefore it may contain information that does not form the prior art that is already known in this country to a person of ordinary skill in the art.

SUMMARY

Disclosed herein are vehicle sensor systems, vehicle user interface systems and related control logic for provisioning vehicle user interface systems, methods for making and methods for operating such systems, and motor vehicles equipped with user interface systems. By way of example, and not limitation, there is presented a user interface system for predicting proximate vehicle behavior, predicting an increased probability of a vehicle to vehicle contact event, and displaying an indication of the increased probability with the associated proximate vehicle.

In accordance with an aspect of the present disclosure, an apparatus including a vehicle controller for determining a first velocity of a host vehicle, a sensor for determining a second velocity of a proximate vehicle, a processor configured for predicting a time of intersection of the first velocity and the second velocity generating a control signal in response to the time of intersection being less than a first threshold time, and a controller configured for providing a vehicle contact warning and performing a contact preparation action in response to the control signal.

In accordance with another aspect of the present disclosure, wherein the controller includes a display configured for highlighting an image of the proximate vehicle in response to the control signal.

In accordance with another aspect of the present disclosure, wherein the first velocity is determined in response to a global positioning system measurement.

In accordance with another aspect of the present disclosure, wherein the vehicle controller is further configured to activate a braking system in response to the control signal.

In accordance with another aspect of the present disclosure, wherein the proximate vehicle is highlighted in a first color when the time of intersection is less than the first threshold time and a second color when the time of intersection is less than a second threshold time, where the first threshold time is greater than the second threshold time.

In accordance with another aspect of the present disclosure, wherein the display is a transparent display overlaid on a rear-view mirror and wherein the image of the proximate vehicle is reflected by the rear-view mirror.

In accordance with another aspect of the present disclosure, wherein the display is a transparent display overlaid on a vehicle windshield and wherein the image of the proximate vehicle is viewed by a driver through the windshield.

In accordance with another aspect of the present disclosure, a method including determining, by a vehicle controller, a second velocity of a host vehicle, determining, by a vehicle sensor, a first velocity of a proximate vehicle, predicting, by a vehicle processor, a time of intersection of the first velocity and the second velocity, and providing, by the vehicle controller, a vehicle contact warning and performing a contact preparation action in response to the control signal.

In accordance with another aspect of the present disclosure further including highlighting an image of the proximate vehicle in a visual display within a vehicle cabin in response to the time of intersection being less than a first threshold time.

In accordance with another aspect of the present disclosure wherein the second velocity is determined in response to a global positioning system signal.

In accordance with another aspect of the present disclosure wherein the first velocity is referenced to the second velocity.

In accordance with another aspect of the present disclosure wherein highlighting the image of the proximate vehicle is performed by displaying a highlight on a transparent video display overlaid on a rear-view mirror when the proximate vehicle is to the rear of the host vehicle.

In accordance with another aspect of the present disclosure wherein highlighting the image of the proximate vehicle is performed by displaying a highlight on a transparent video display overlaid on a vehicle windshield when the proximate vehicle is to the front of the host vehicle.

In accordance with another aspect of the present disclosure wherein the proximate vehicle is highlighted in a first color when the time of intersection is less than the first threshold time and a second color when the time of intersection is less than a second threshold time, where the first threshold time is greater than the second threshold time.

In accordance with another aspect of the present disclosure further including providing an audible alert when the time of intersection is less than a second threshold time, where the first threshold time is greater than the second threshold time.

In accordance with another aspect of the present disclosure further including adjusting a vehicle alignment with respect to a roadway lane marker in response to the time of intersection being less than a first threshold time.

In accordance with another aspect of the present disclosure, a vehicle contact warning system including a global positioning system sensor for detecting a first velocity a host vehicle, a vehicle sensor for determining a second velocity of a proximate vehicle relative to the host vehicle, a processor configured to estimate a time of intersection of the first velocity and the second velocity and to generate a warning signal if the time of intersection is less than a threshold time, and a vehicle controller configured for providing a vehicle contact warning and performing a contact preparation action in response to the warning signal.

In accordance with another aspect of the present disclosure including a display for displaying an image of the proximate vehicle, the display being further operative to highlight the image of the proximate vehicle in response to the warning signal In accordance with another aspect of the present disclosure wherein the display is a rear-view mirror and wherein the highlight of the image of the proximate vehicle is displayed by a transparent display overlaid on the rear-view mirror.

In accordance with another aspect of the present disclosure wherein the display is a windshield and wherein the highlight of the image of the proximate vehicle is displayed by a transparent display overlaid on the windshield.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle contact events with other vehicles and stationary objects, such as collisions, are one of the leading causes of injury and death in addition to resulting in millions of dollars in property damage. The majority of vehicle contact events resulting in occupant injury occur between the rear of one vehicle and the front of another. To avoid these events, drivers need to be made aware of potential threats behind them, without diverting their attention to the road in front of them. This exemplary system and method creates and monitors risk profiles for vehicles in real time using rear facing cameras, signals from existing modules and computer vision algorithms. These risk levels may then be communicated by superimposing color on target vehicles in the rear view camera. Using vehicle contact severity reduction strategies, alongside vision augmentation, this technology can greatly reduce the chances of vehicle contact.

The exemplary system and method are configured to provide real time threat communication by superimposing color correlated to threat level on corresponding vehicle image on rear camera mirror or any secondary display in order to reduce occurrences of vehicle contact events, particularly from the rear. For example, an LED indicator on rear view mirror display may be illuminated when there is an imminent rear-end contact event. A small number of recent vehicles are equipped with advanced safety system like frontal contact event warning but are not indicative of the vehicle which provides the threat of a contact event, thereby reducing the effectiveness of the warning system.

Figure 1A:
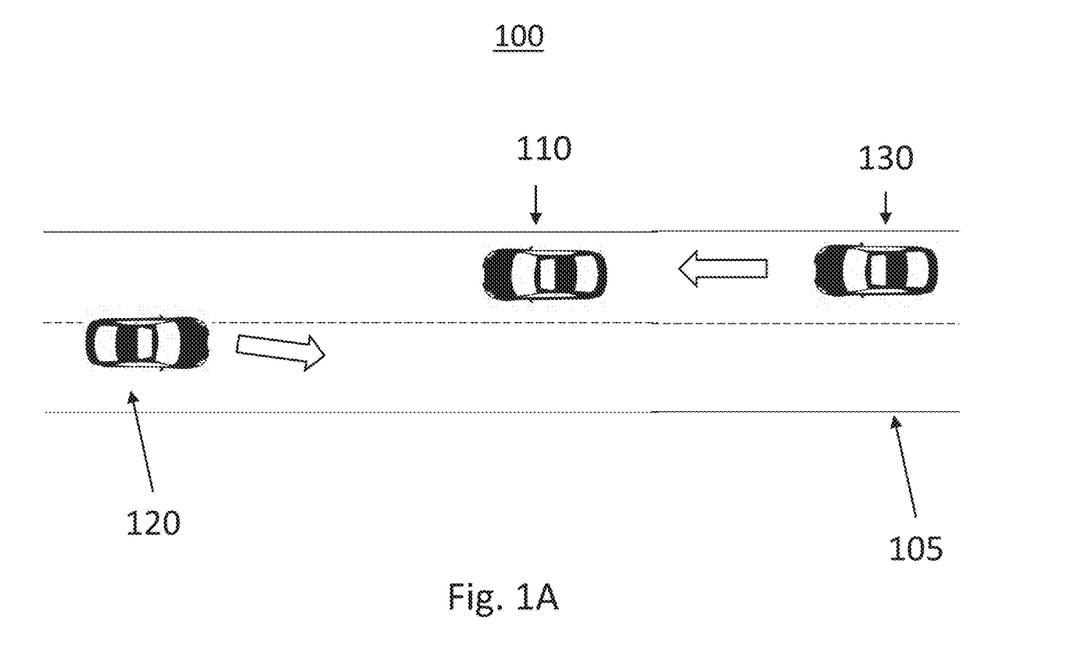
FIG. 1A shows an operating environment for providing detection and display vehicle contact threats for mitigation in a vehicle according to an exemplary embodiment.

FIG. 1A is illustrative of an exemplary environment 100 for providing detection and display of vehicle contact threats for mitigation in a host vehicle 110. In this exemplary embodiment of the present disclosure, the host vehicle 110 is travelling on a two-lane roadway 105. Also traveling on the roadway 105 in this example are two proximate vehicles, a following vehicle 130 and an approaching vehicle 120. Sensors on the host vehicle 110 are used to estimate the velocity, the speed and direction, of the host vehicle 110 and each of the proximate vehicles and determine the likelihood that a vehicle contact event may occur. The sensors may include Lidar, Radar, cameras or the like.

The exemplary system is configured to estimate the velocity of each of the proximate vehicles, determine the velocity of the host vehicle 110, and predict if a vehicle contact may occur. If a vehicle contact is predicted, the exemplary system may provide a warning to a vehicle occupant via a user interface. The warning may include an indication of the proximate vehicle and an intensity corresponding to a likelihood of a predicted vehicle contact. For example, the user interface may use augmented reality to highlight the following vehicle 130 in a rear view mirror in response to a elevated likelihood of a vehicle contact event between the host vehicle 110 and the following vehicle 130.

Figure 1B:
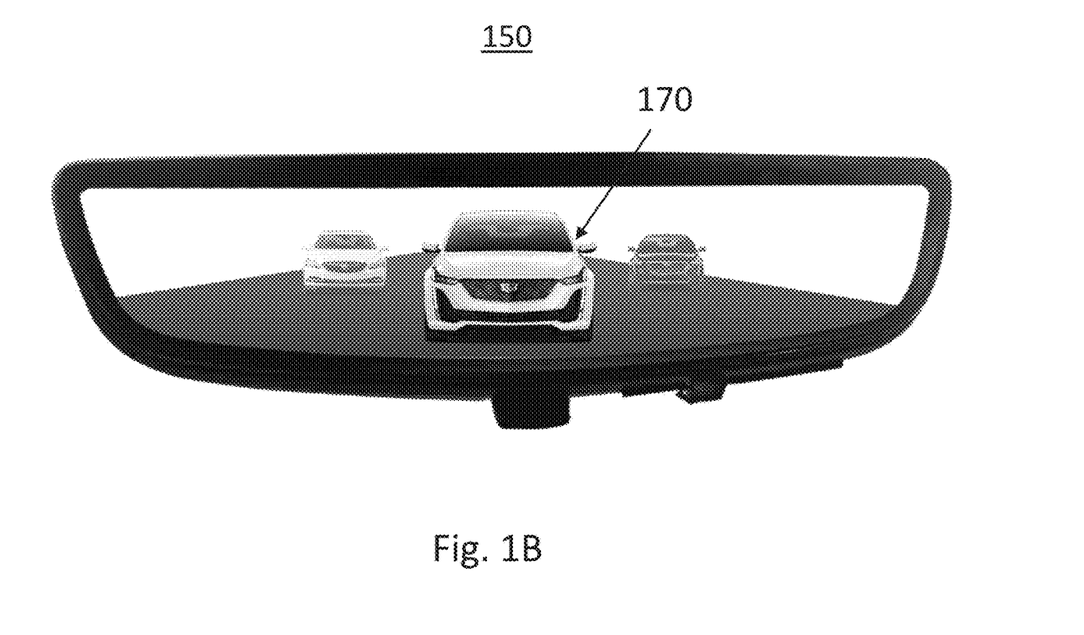
FIG. 1B shows an operating environment for providing detection and display vehicle contact threats for mitigation in a vehicle according to an exemplary embodiment

FIG. 1B is illustrative of an exemplary rear-view mirror 150 for providing detection and display of vehicle contact threats for mitigation in a vehicle 110. In this exemplary embodiment of the present disclosure, the rear view mirror 150 may be configured to provide an augmented reality view, such as providing computer generated graphics over an image captured by a camera or over a reflection such as is provided by a conventional mirror. In this example, the rear-view mirror 150 shows a rear view from the host vehicle. When the exemplary detection system predicts a possible vehicle contact with a following vehicle 170 having a likelihood exceeding a threshold, the rear-view mirror is configured to highlight the following vehicle 170 to provide the warning to a vehicle occupant. For example, the warning may provide a real time vehicle contact threat communication by superimposing a color correlated to threat level on corresponding vehicle image on rear camera mirror or any secondary display.

The exemplary system may communicate rear vehicle contact event threat level by superimposing colors on top of vehicle images in rear camera mirror or back-facing display. The superimposed color and intensity on rear camera mirror display may be based on predicted likelihood of a vehicle contact occurrence where the color is correlated to escalating threat level. The exemplary system may use conventionally installed hardware and sensors, such as cameras, to intelligently detect and highlight vehicles based on threat level. Alternatively, an LED indicator on rear view mirror display when there is a predicted rear vehicle contact or other LEDs forward of the driver's view when there is a predicted front vehicle contact.

Figure 2:
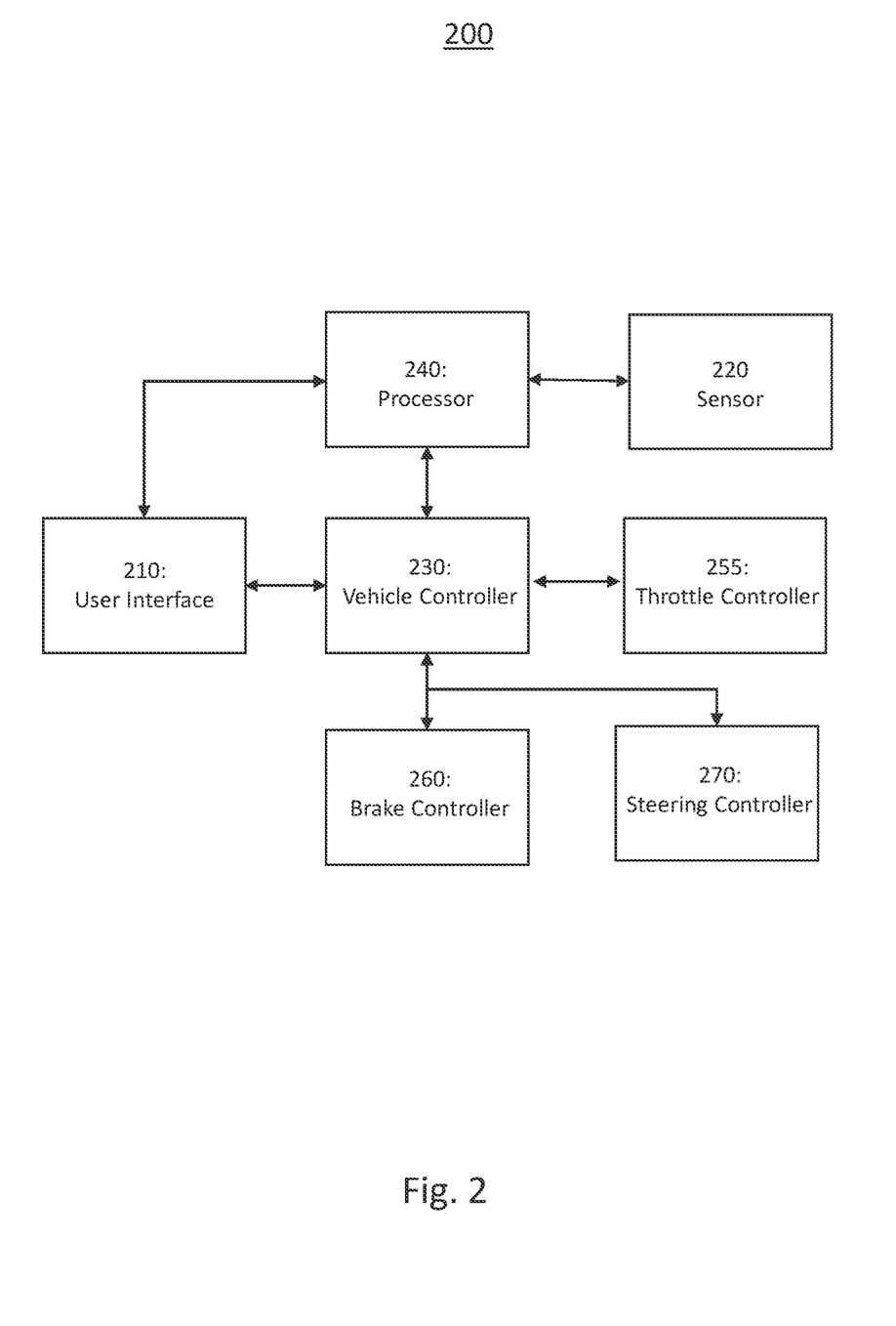
FIG. 2 shows a block diagram illustrating an exemplary system for providing detection and display vehicle contact threats for mitigation in a vehicle according to an exemplary embodiment.

Turning now to FIG. 2, a block diagram illustrating an exemplary implementation of a system 200 for providing detection and display of vehicle contact threats for mitigation in a vehicle is shown. The system 200 may include a processor 240, a sensor 220, a user interface 210 and a vehicle controller 230.

During operation, the system 200 is configured to use one or more sensors 220 such as a camera, infrared, radar, or lidar to detect proximate vehicles and other external objects. Sensor fusion algorithms may provide accurate tracking of proximate vehicles and external objects as well as calculation of appropriate attributes such as velocities, relative velocities, accelerations, and the like. The sensor 220 is operative to determine distances to objects within a field of view (FOV) which may include static and dynamic objects proximate to the vehicle. For cameras, image processing techniques may be used to identify and locate objects within the FOV. The sensor 220 may be used to periodically detect the location or proximate vehicles such that a velocity and/or for the proximate vehicle may be determined. Object location data generated by the sensor 220 may then be coupled to a processor 240.

The vehicle controller 230 may generate control signals for coupling to other vehicle system controllers, such as a throttle controller 255, a brake controller 260 and a steering controller 270 in order to control the operation of the vehicle. In addition, the vehicle controller may receive data from other vehicle systems such as global positioning systems (GPS), inertial measurement unit (IMU), memory within the vehicle and wireless network connections, such as cellular network connections. In response to the received data, the vehicle controller 230 may provide a host vehicle velocity to the processor 240 as well as steering, braking, and throttle setting data and acceleration data of the host vehicle.

In response to the received data, the processor 240 is configured to determine if a possible vehicle contact event is likely. The processor 240 may be a digital signal processor, a sensor fusion processor, a depth map processor, or the like.

In one exemplary embodiment, the processor 240 receives data from the sensor 220 and the vehicle controller 230 and determines velocities for the host vehicle and each of the proximate vehicles. If the predicted vehicle paths as indicated by the velocities may intersect, the processor 240 may then determines a time to intersection. If the time is less than a first threshold, such as five seconds, the processor may then generate a first data signal indicative of a first intensity warning level and couple this first data signal to the user interface 235. If the time is less than a second threshold, where the second threshold is lower than the first threshold, such as two seconds, the processor may then generate a second data signal indicative of a second intensity warning level and couple this second data signal to the user interface 235. Alternatively, the processor may determine a likelihood of vehicle contact in response to the instantaneous vehicle velocities and/or in response to the vehicle paths. For example, if a proximate vehicle has a 25% to 50% likelihood of vehicle contact, the processor may couple a data signal to the user interface indicative of a first intensity warning level. If a proximate vehicle has a 50% to 75% likelihood of vehicle contact, the processor may couple a data signal to the user interface indicative of a second intensity warning level.

The user interface 210 is a device which may provide a warning to vehicle occupants in response to a prediction of a possible vehicle contact event. The user interface 210 may include one more indicator lights, such as light emitting diodes located within a vehicle cabin. Alternatively, the user interface 210 may be a display or a transparent overlay affixed to a windshield, window, or rear-view mirror. In the example of a display or an overlay, the user interface 210 may be configured to highlight one or more proximate vehicles in response to the first data signal and/or the second data signal. The user interface 210 may provide different color or different intensity warnings depending on the intensity warning level or in response to the predicted time to intersection of the host vehicle velocity and the proximate vehicle velocity. For example, if the intersection time is less than the first threshold, the vehicle image may be highlighted yellow. If the intersection time is less than the first threshold, the vehicle image may be highlighted red.

In addition, if a vehicle contact event is predicted when the host vehicle is stopped, the vehicle controller 230 may be configured for providing a vehicle contact warning via the user interface 210 for example, and/or performing a contact preparation action in response to a control signal from the processor 240. For example, the vehicle controller 230 may change an application level of the braking system in response to the possible vehicle contact event. For example, braking force applied by the driver in rear-end collision is often not representative of 100% vehicle braking force capability. In this exemplary embodiment, the vehicle controller 230 may generate a control signal to apply 100% braking force after evaluating an appropriate situation. In addition, the vehicle controller may generate control signals to couple to steering and/or throttle controllers to adjust wheel/vehicle angle to straight with respect to lane marking in order to prevent vehicle contact events with other proximate vehicles.

In addition, the vehicle controller 230 may be configured to manage host vehicle speed and gap in front to avoid a rear end collision if vehicle is moving within slow speed traffic. The vehicle controller 230 may adjusting seats to most ergonomic position to reduce effect of vehicle contact events, pre-tension seats belt in case of rear-end vehicle contact, and/or pre-initiate an emergency wireless communications, in order to address post vehicle contact events.

Data being transmitted may include host vehicle location, images, vehicle system values, etc.

Figure 3:
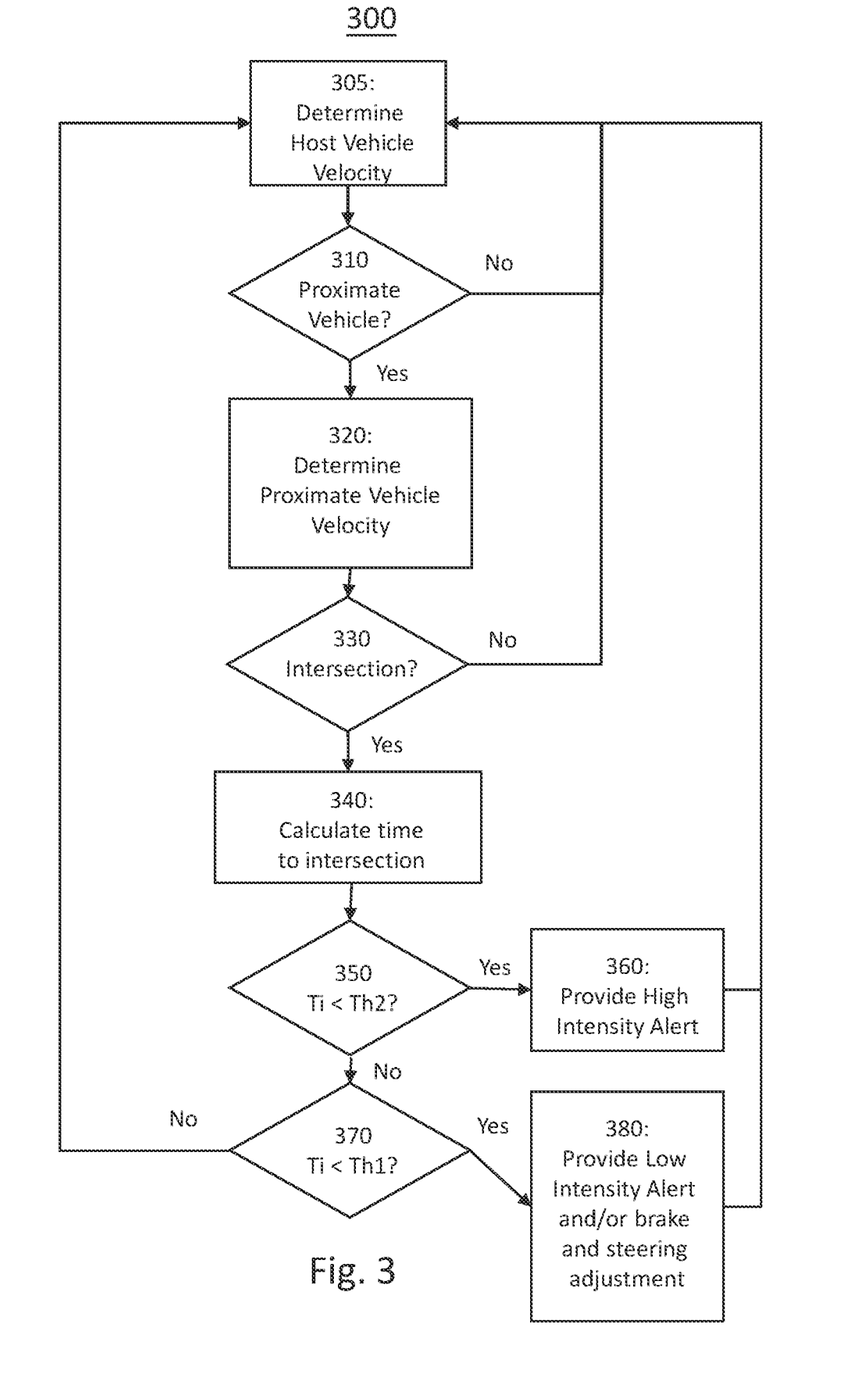
FIG. 3 shows a flow chart illustrating an exemplary method for providing detection and display vehicle contact threats for mitigation in a vehicle according to another exemplary embodiment.

Turning now to FIG. 3, a flow chart illustrating an exemplary implementation of a method 300 for providing detection and display of vehicle contact threats for mitigation in a vehicle is shown. Initially, the method is configured to determine 305 a host vehicle velocity. The velocity may include a speed and a direction. The method may further use vehicle acceleration data, vehicle steering, braking and throttle settings and the like to predict a host vehicle path. The host vehicle velocity may be determined in response to a GPS signal, other GNSS signal, or in response to vehicle sensors such as IMU, speedometer, accelerometers, steering, braking and throttle controllers and the like.

The method is next operative to detect 310 if there is a proximate vehicle around the host vehicle. A vehicle may be determined to be a proximate vehicle if it detected by a vehicle sensor, such as a lidar, radar, infrared sensor or camera imaging system. Additionally, a detected vehicle may be determined to be a proximate vehicle if the detected vehicle is determined to be within a threshold distance of the host vehicle. An exemplary threshold distance may be 200 meters. If no proximate vehicle is detected, the method the returns to determining 305 the host vehicle velocity.

If a proximate vehicle is detected, the method then determines 320 the proximate vehicle's velocity. The method may further determine the current location of the host vehicle and the current location of the proximate vehicle. The current location of the host vehicle may be determined in response to a GPS signal or the like. The current location of the proximate vehicle may be determined in response to the host vehicle location and the relative location of the proximate vehicle with respect to the host vehicle.

The method is next configured to determine 330 if the proximate vehicle velocity and the host vehicle velocity will intersect. If the proximate vehicle velocity and the host vehicle velocity are not predicted to intersect, the method returns to determine 305 the host vehicle velocity. If the proximate vehicle velocity and the host vehicle velocity are determined 330 to intersect, the method then calculates 340 a time of intersection. The time of intersection can be calculated in response to the host vehicle velocity and the proximate vehicle velocity. In addition, cumulative velocity information may be used for both the host vehicle velocity and the proximate vehicle velocity, as well as proximate vehicle acceleration and/or host vehicle acceleration may additionally be used for predicting a time to intersection.

If the time to intersection (Ti) is less than a second threshold (Th2), the method provides 360 a high intensity alert to vehicle operator and/or vehicle occupants. The high intensity alert may include highlighting an image of the proximate vehicle, such as the reflection of the proximate vehicle in a rear-view mirror, in a high intensity color. For example, the image of the proximate vehicle may be highlighted in red. Furthermore, an audible alarm may be triggered in response to the high intensity alert. The method is then operative to return to determining 305 the host vehicle velocity. In addition, the method may be configured to adjust brake application level, adjust host vehicle wheel angle with respect to lane marking, adjust seat positions, adjust seatbelt tension and to initiate an emergency wireless signal transmission via a wireless cellular network or the like.

If the time to intersection is greater than the second threshold, the method then determines 370 if the time to intersection (Ti) is less than a first threshold (Th1). In this example, the first threshold time (Th1) is greater than the second threshold time (Th2). If the time to intersection is less than the first threshold time, the method next provides 380 a low intensity alert to provide to the vehicle operator and/or vehicle occupants. The low intensity alert may include highlighting an image of the proximate vehicle, such as the reflection of the proximate vehicle in a rear-view mirror, in a lower intensity color. For example, the image of the proximate vehicle may be highlighted in yellow. Alternatively, a light on the rear-view mirror, such as a light emitting diode may be illuminated to indicate the low intensity alert. The method is then operative to return to determining 305 the host vehicle velocity. If the time to intersection is greater than the second threshold, the method is then operative to return to determining 305 the host vehicle velocity.

Figure 4:
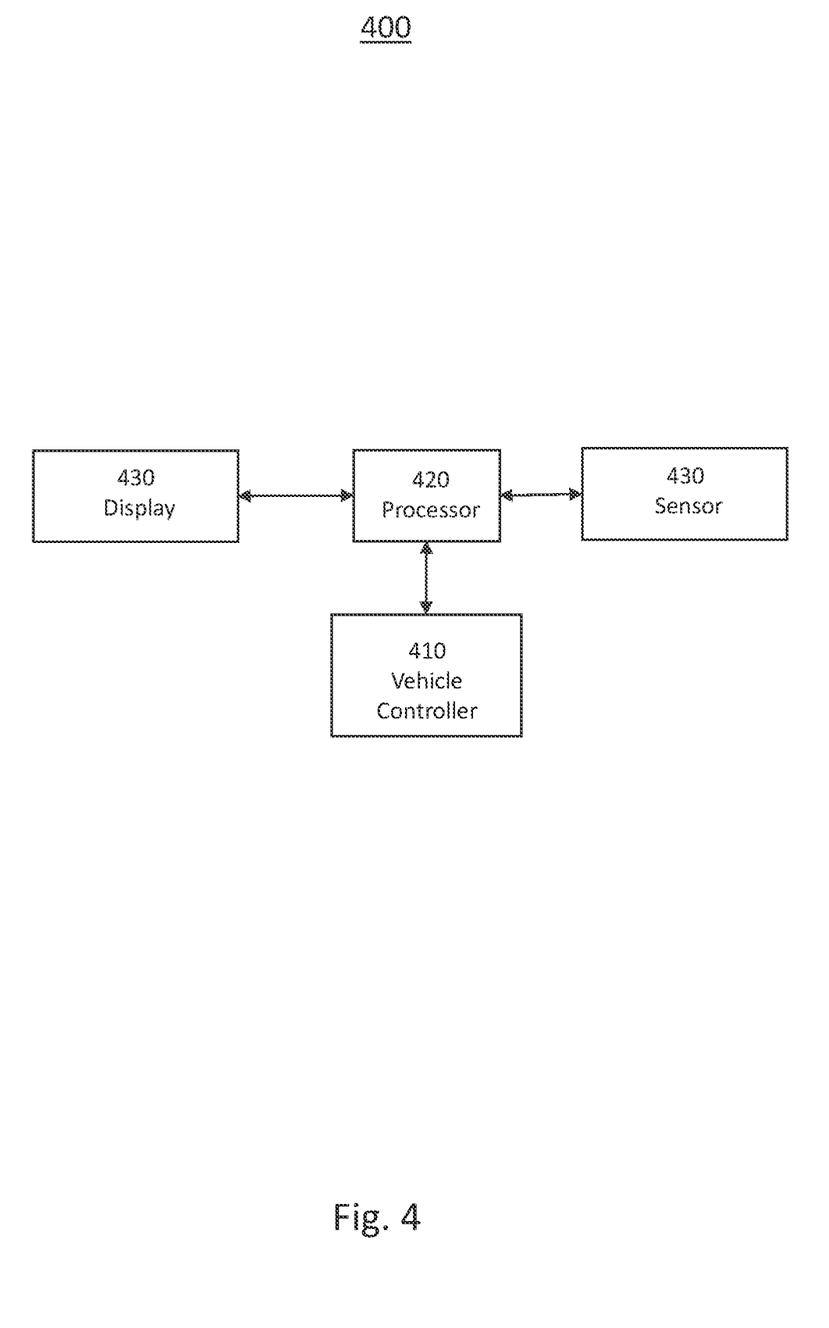
FIG. 4 shows a block diagram illustrating another exemplary system for providing detection and display vehicle contact threats for mitigation in a vehicle according to another exemplary embodiment.

Turning now to FIG. 4, a block diagram illustrating another exemplary implementation of a system 400 for providing detection and display of vehicle contact threats for mitigation in a vehicle is shown. The exemplary system 400 may include a vehicle controller 410, a processor 420, a sensor 430, and a display 440.

The vehicle controller 410 for determining a first velocity of a host vehicle; the first velocity is determined in response to a global positioning system measurement. The vehicle controller 410 may be used a measurement provided by a global positioning system to determine the vehicle speed and direction. Alternatively, the vehicle velocity may be estimated in response to other vehicle sensors coupled to the vehicle controller 410, such as inertial measurement units and vehicle speed detectors.

The exemplary system may further include a sensor 430 for determining a second velocity of a proximate vehicle; the sensor is at least one of a radar, a lidar, an infrared sensor, and a camera. wherein the second velocity is referenced to the first velocity. The sensor may be used to periodically determine a location of the proximate vehicle to determine a vehicle path and speed. The vehicle path and speed may be used to estimate the proximate vehicle velocity. Alternatively, the system may use the host vehicle speed and a default direction as the host vehicle velocity. The proximate vehicle velocity may then be determined relative to the host vehicle velocity. For example, the proximate vehicle velocity may be determined to be 2.2 m/s and +5 degrees to the velocity of the host vehicle.

The exemplary system 400 may further include a processor 420 configured for predicting a time of intersection of the first velocity and the second velocity generating a control signal in response to the time of intersection being less than a first threshold time. The processor 420 may determine the host vehicle in response to the data from the vehicle controller 410. The processor 420 may determine the proximate vehicle velocity in response to the sensor data received from the vehicle sensor 430. The time of intersection may then be determined using standard mathematical techniques, such as trigonometry, to determine when the two velocities intersect. The processor 420 may then compare the time to intersection to various threshold times. If the time to intersection is less than a first threshold, the processor may generate a first control signal indicative of a first intensity warning and couple this first control signal to the display 440. If the time to intersection is less than a second threshold time, where the second threshold time is lower than the first threshold time, a second control signal may be generated indicative of a second intensity warning. The second control signal may then be coupled to the display 440 for presentation to the driver or vehicle occupant.

The display 440 may be configured for highlighting an image of the proximate vehicle in response to the control signal. For example, the proximate vehicle may be highlighted in a first color when the time of intersection is less than the first threshold time and a second color when the time of intersection is less than a second threshold time, where the first threshold time is greater than the second threshold time. In a first exemplary embodiment, the display 440 may be a transparent display overlaid on a rear-view mirror and wherein the image of the proximate vehicle is reflected by the rear-view mirror. In a second exemplary embodiment, the display 440 may be a transparent display overlaid on a vehicle windshield and wherein the image of the proximate vehicle is viewed by a driver through the windshield.

In an exemplary embodiment, the system 400 may be configured to perform a vehicle contact warning algorithm wherein the vehicle controller 410 includes a global positioning system sensor for measuring a host vehicle velocity. In addition, the system 300 includes a vehicle sensor 430, such as a lidar, radar, infrared sensor or camera, for determining a second velocity of a proximate vehicle relative to the host vehicle and a processor 420 configured to estimate a time of intersection of the first velocity and the second velocity and to generate a warning signal if the time of intersection is less than a threshold time. The system 400 further includes a display 440 configured for displaying an image of the proximate vehicle, the display being further operative to highlight the image of the proximate vehicle in response to the warning signal. In a first embodiment, the display 440 may be a rear-view mirror and wherein the highlight of the image of the proximate vehicle is displayed by a transparent display overlaid on the rear-view mirror. In a second embodiment, the display 440 may be a windshield and wherein the highlight of the image of the proximate vehicle is displayed by a transparent display overlaid on the windshield.

Figure 5:
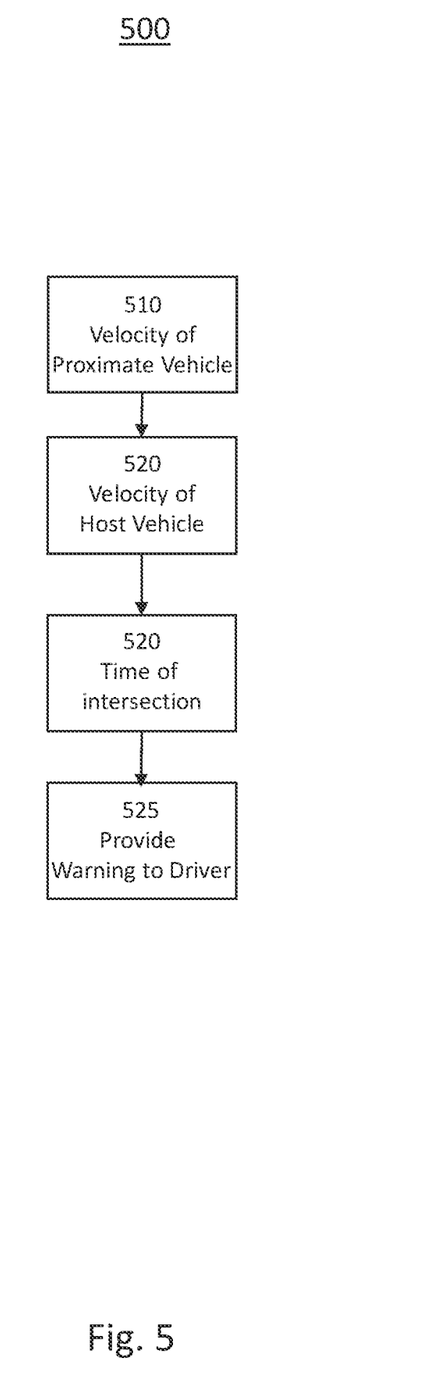
FIG. 5 shows a flow chart illustrating another exemplary method for providing detection and display vehicle contact threats for mitigation in a vehicle according to another exemplary embodiment.

Turning now to FIG. 5, a flow chart illustrating an exemplary implementation of a system 500 for providing detection and display of vehicle contact threats for mitigation in a vehicle is shown. The exemplary method 500 is first operative for determining 510 a first velocity of a proximate vehicle; wherein the vehicle sensor is at least one of a radar sensor, a lidar sensor, an infrared sensor, and a camera. The first velocity may be determined by transmitting a signal, such as an electromagnetic pulse, in a known direction towards the proximate vehicle. The distance of the proximate vehicle may then be determined in response to the propagation time of the signal and a reflection of the signal from the proximate vehicle. With the direction and the distance know, a relative location of the proximate vehicle from the host vehicle may be determined. A number of these proximately vehicle location determinations taken periodically over time may be made to determine a velocity of the proximate vehicle.

The method is next configured to determining 520 a second velocity of a host vehicle. The location or the host vehicle may be determined in response to a global positioning system signal. Likewise, the velocity of the host vehicle may be determined in response to a number of host vehicle location determinations taken periodically over time. In one exemplary embodiment, the first velocity is referenced to the second velocity. In a second exemplary embodiment, the GPS location of the host vehicle, the known direction to the proximate vehicle and the known distance to the proximate vehicle may be used to determine a true or geographical location of the proximate vehicle and a true velocity of the proximate vehicle.

The method is next configured to predict 530 a time of intersection of the host vehicle velocity and the proximate vehicle velocity. A processor may be used to compare the host vehicle direction and the proximate vehicle direction to determine if there will be an intersection of the vehicle paths. If there is an intersection of the vehicle paths, a time to reach the point of intersection for each of the vehicles may then be determined. If the time to reach the point of intersection is the same, or nearly the same, for both vehicles, a vehicle contact event may be likely. The time to reach the intersection for the vehicle is then the time of intersection. The method may then use the time of intersection to determine an intensity of warning to be provide to a driver via a user interface or display.

The exemplary system next configured for highlighting 540 an image of the proximate vehicle in a visual display within a vehicle cabin in response to the time of intersection being less than a first threshold time. In a first exemplary embodiment, highlighting the image of the proximate vehicle may be performed by displaying a highlight on a transparent video display overlaid on a rear-view mirror when the proximate vehicle is to the rear of the host vehicle. Alternatively, highlighting the image of the proximate vehicle may be performed by displaying a highlight on a transparent video display overlaid on a vehicle windshield when the proximate vehicle is to the front of the host vehicle.

In this exemplary embodiment, the proximate vehicle may be highlighted in a first color when the time of intersection is less than the first threshold time and a second color when the time of intersection is less than a second threshold time. The first threshold time is greater than the second threshold time. In addition, the method may be configured for providing an audible alert to the vehicle operator when the time of intersection is less than the second threshold time, where the first threshold time is greater than the second threshold time. The method may highlight the image of the proximate vehicle by displaying a highlight over an image of the proximate vehicle in a rear facing display thereby highlighting the proximate vehicle within the display. In addition, the method may highlight the border of a rear-view mirror when the time of intersection is less than a second threshold time, where the first threshold time is greater than the second threshold time. Highlighting the border of the rear-view mirror may draw further attention to the proximate vehicle in addition to highlighting the proximate vehicle alone.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
a vehicle controller for determining a first velocity of a host vehicle;

a sensor for determining a second velocity of a proximate vehicle;

a processor configured for predicting a time of intersection of the first velocity and the second velocity generating a first control signal indicative of a first intensity warning level in response to the time of intersection being less than a first threshold time and greater than a second threshold time and a second control signal indicative of a second intensity warning level in response to the time of intersection being less than a second threshold time; and a controller configured for providing a vehicle contact warning to an operator of the host vehicle and performing a contact preparation action in response to the control signal wherein the controller includes a transparent overlay configured for highlighting an image of the proximate vehicle viewed through the transparent overlay in response to the first control signal wherein the proximate vehicle is highlighted in a first color when the time of intersection is less than the first threshold time and in response to the second control signal wherein the proximate vehicle is highlighted in a second color and an audible alarm is triggered when the time of intersection is less than the second threshold time, where the first threshold time is greater than the second threshold time and wherein the transparent overlay is overlaid on a vehicle windshield and wherein the proximate vehicle is viewed by a driver through the windshield.

2. The apparatus of claim 1, wherein the view of the proximate vehicle is not computer generated.

3. The apparatus of claim 1, wherein the vehicle controller is further configured to activate at least one of a braking system, a steering system and a throttle controller in response to the host vehicle being stopped and at least one of the first control signal and the second control signal.

4. The apparatus of claim 1, wherein the transparent overlay is overlaid on a rear-view mirror and wherein a view of the proximate vehicle is reflected by the rear-view mirror.

5. A method comprising:
determining, by a vehicle controller, a second velocity of a host vehicle;
determining, by a vehicle sensor, a first velocity of a proximate vehicle;
predicting, by a vehicle processor, a time of intersection of the first velocity and the second velocity; and
providing, by the vehicle controller, a vehicle contact warning and performing a contact preparation action in response to the time of intersection wherein the vehicle controller includes a transparent overlay and wherein the vehicle contact warning includes highlighting the proximate vehicle viewed through the transparent overlay wherein the proximate vehicle is highlighted in a first color, indicative of a first intensity level, when the time of intersection is less than the first threshold time and a second color, indicative of a second intensity level, when the time of intersection is less than a second threshold time, where the first threshold time is greater than the second threshold time, and wherein an audible alarm is triggered when the time of intersection is less than a second threshold time and wherein the transparent overlay is overlaid on a vehicle windshield and wherein the proximate vehicle is viewed by a driver through the windshield.

6. The method of claim 5, wherein the second velocity is determined in response to a global positioning system signal.

7. The method of claim 5, wherein the first velocity is referenced to the second velocity.

8. The method of claim 5, wherein highlighting the proximate vehicle is performed by displaying a highlight on the transparent overlay overlaid on a rear-view mirror when the proximate vehicle is to the rear of the host vehicle.

9. The method of claim 5, wherein highlighting the proximate vehicle is performed by displaying a highlight on the transparent overlay overlaid on the vehicle windshield when the proximate vehicle into the front of the host vehicle.

10. The method of claim 5, further including adjusting a vehicle alignment with respect to a roadway lane marker in response to the time of intersection being less than a first threshold time.

11. A vehicle contact warning system comprising:
a global positioning system sensor for detecting a first velocity a host vehicle;
a vehicle sensor for determining a second velocity of a proximate vehicle relative to the host vehicle;
a processor configured to estimate a time of intersection of the first velocity and the second velocity and to generate a first warning signal indicative of a first intensity warning level if the time of intersection is less than a first threshold time and greater than a second threshold time and a second warning signal indicative of a second intensity warning level if the time of intersection is less than the second threshold time; and
a vehicle controller configured for providing a vehicle contact warning and performing a contact preparation action in response to the first warning signal and the second warning signal wherein the vehicle controller includes a transparent overlay and wherein the vehicle contact warning includes highlighting the proximate vehicle viewed through the transparent overlay in a first color when the time of intersection is less than the first threshold time and a second color when the time of intersection is less than a second threshold time, where the first threshold time is greater than the second threshold time, wherein an audible alarm is triggered when the time of intersection is less than a second threshold time and wherein the transparent overlay is overlaid on a windshield and wherein the highlight of the-proximate vehicle is displayed by the transparent overlay and the proximate vehicle is viewed by a driver through the windshield.

12. The vehicle contact warning system of claim 11 further including a display for displaying an image of the proximate vehicle, the display being further operative to highlight the image of the proximate vehicle in response to the warning signal.

13. The vehicle contact warning system of claim 12, wherein the transparent overlay is overlaid on a rear-view mirror and wherein the highlight of the proximate vehicle is displayed by the transparent display and a reflection of the proximate vehicle is viewed by a driver through the rear-view mirror.

* * * * *